US005999074A

United States Patent [19]

Coleman, Jr. et al.

[11] Patent Number: 5,999,074

[45] Date of Patent: Dec. 7, 1999

[54] MAGNETIC HEAD FOR MAGNETIC PICK-UP TOOL

[75] Inventors: Edward S. Coleman, Jr., Ridgefield, Conn.; Stanley Stromski, Riverhead, N.Y.

[73] Assignee: Ullman Devices Corporation, Ridgefield, Conn.

[21] Appl. No.: 08/796,015

[22] Filed: Feb. 5, 1997

[51] Int. Cl.[6] ................................ B25J 15/06; H01F 7/20

[52] U.S. Cl. ........................................... 335/285; 294/65.5

[58] Field of Search ............................ 335/285, 296–306; 294/65.5

[56] References Cited

U.S. PATENT DOCUMENTS

| | | | |
|---|---|---|---|
| D. 276,690 | 12/1984 | Hamatani . | |
| D. 334,519 | 4/1993 | Arnold . | |
| D. 342,428 | 12/1993 | Olszak . | |
| D. 376,089 | 12/1996 | Allen . | |
| D. 378,337 | 3/1997 | Reynolds et al. . | |
| 2,218,825 | 10/1940 | Guillou . | |
| 2,372,930 | 4/1945 | Bovee . | |
| 2,428,864 | 10/1947 | Boyd . | |
| 2,471,764 | 5/1949 | Miller et al. . | |
| 2,547,990 | 4/1951 | Willms . | |
| 2,637,590 | 5/1953 | Ortloff . | |
| 2,683,618 | 7/1954 | Long . | |
| 2,853,331 | 9/1958 | Teetor | 335/285 |
| 2,915,681 | 12/1959 | Troy . | |
| 2,947,563 | 8/1960 | Stitt . | |
| 2,976,075 | 3/1961 | Budreck . | |
| 2,993,723 | 7/1961 | Twachtman et al. . | |
| 3,041,697 | 7/1962 | Budreck | 24/303 |
| 3,086,268 | 4/1963 | Chaffin | 24/303 |
| 3,169,791 | 2/1965 | Twachtman . | |
| 3,223,898 | 12/1965 | Bey . | |
| 3,297,352 | 1/1967 | Larrison et al. . | |
| 3,384,408 | 5/1968 | Furzey . | |
| 3,503,645 | 3/1970 | Huddy . | |
| 3,582,123 | 6/1971 | Kyser . | |
| 3,646,492 | 2/1972 | Westermann . | |
| 3,732,243 | 5/1973 | Mount . | |
| 3,789,336 | 1/1974 | Gordin . | |
| 4,059,155 | 11/1977 | Greer . | |
| 4,105,239 | 8/1978 | Akczinski, Sr. . | |
| 4,178,029 | 12/1979 | Lapan . | |
| 4,554,703 | 11/1985 | Matuki . | |
| 4,575,143 | 3/1986 | Nast . | |
| 4,802,702 | 2/1989 | Bownds . | |
| 4,813,729 | 3/1989 | Speckhart . | |
| 4,850,133 | 7/1989 | Burzdak et al. . | |
| 4,943,098 | 7/1990 | Aoyama . | |
| 5,062,672 | 11/1991 | Harris . | |
| 5,099,539 | 3/1992 | Forester . | |
| 5,169,193 | 12/1992 | Stelmach . | |
| 5,249,832 | 10/1993 | Leonardz . | |
| 5,261,714 | 11/1993 | Slusar et al. . | |
| 5,265,887 | 11/1993 | Stelmach . | |
| 5,288,119 | 2/1994 | Crawford, Jr. et al. . | |
| 5,314,221 | 5/1994 | Hammer . | |
| 5,348,359 | 9/1994 | Boozer . | |
| 5,360,247 | 11/1994 | Vachter . | |
| 5,381,319 | 1/1995 | Shiao . | |
| 5,395,148 | 3/1995 | Jameson et al. . | |
| 5,429,402 | 7/1995 | Kennedy . | |
| 5,433,492 | 7/1995 | Glossop, Jr. . | |
| 5,472,253 | 12/1995 | Resor . | |

FOREIGN PATENT DOCUMENTS

| | | | |
|---|---|---|---|
| 175645 | 7/1953 | Austria | 335/285 |

*Primary Examiner*—Michael L. Gellner
*Assistant Examiner*—Raymond Barrera
*Attorney, Agent, or Firm*—Bachman & Lapointe, P.C.

[57] ABSTRACT

A magnetic head for a magnetic pick-up tool includes a magnet having a pick-up surface and a sleeve member having an open end and being slidably positioned over the magnet, the sleeve member being made of a material acted upon by the magnet such that the magnet exerts a force upon the sleeve for maintaining the sleeve in a rest position wherein the open end extends beyond the pick-up surface, wherein the sleeve is slidable in a direction away from the pick-up surface and against the force to a withdrawn with respect to the magnet. A magnetic pick-up tool including a magnet head is also disclosed.

15 Claims, 2 Drawing Sheets

MAGNETIC HEAD FOR MAGNETIC PICK-UP TOOL

BACKGROUND OF THE INVENTION

The invention relates to a magnetic head for a magnetic pick-up tool, and a magnetic pick-up tool including same.

Magnetic pick-up tools are used widely for retrieving ferrous metallic or other magnetically acted upon materials from difficult-to-reach locations. Such tools are used, for example, by mechanics working on automobiles, welders, technicians, machinists, fishermen, toolmakers, hobbyists and the like.

A common problem encountered with conventional pick-up tools is that the magnet used for retrieving desired objects has attraction not only upon a leading or pick-up surface, but on side surfaces as well. Thus, when reaching through other ferrous metallic objects, the magnet has a tendency to attract or deflect toward an undesired ferrous or other magnetically attracted surface or object.

A further problem experienced in the art is the need to provide a magnet which has significant lifting power in a device which is simple and efficient to manufacture, and which is compact and convenient to use.

In light of the foregoing, it is clear that the need remains for a magnetic head for a magnetic pick-up tool device which has good lifting power and which has reduced or eliminated tendency to attract toward ferrous metal or other magnetically attracted objects positioned radially or to the side of the magnet.

It is therefore the primary object of the present invention to provide a magnetic head for a magnetic pick-up tool wherein side attractive forces of the magnet are substantially reduced or eliminated.

It is a further object of the present invention to provide a magnetic head for a magnetic pick-up tool wherein the effective lifting power of a magnet incorporated therein is increased.

It is still another object of the present invention to provide a magnetic pick-up tool incorporating the magnetic head of the present invention which is simple and inexpensive to manufacture and easy to use.

Other objects and advantages of the present invention will appear hereinbelow.

SUMMARY OF THE INVENTION

In accordance with the present invention, the foregoing objects and advantages are readily attained.

According to the invention, a magnetic head for a magnetic pick-up tool is provided which comprises: a magnet having a pick-up surface; and a sleeve member having an open end and being slidably positioned over said magnet, said sleeve member comprising a material acted upon by said magnet such that said magnet exerts a force upon said sleeve for maintaining said sleeve in a rest position wherein said open end extends beyond said pick-up surface, wherein said sleeve is slidable in a direction away from said pick-up surface and against said force to a withdrawn position with respect to said magnet.

In further accordance with the invention, a magnetic pick-up tool is provided which comprises: a handle member; and a magnetic head attached to said member and comprising a magnet having a pick-up surface and a sleeve member having an open end and being slidably positioned over said magnet, said sleeve member comprising a material acted upon by said magnet such that said magnet exerts a force upon said sleeve for maintaining said sleeve in a rest position wherein said open end extends beyond said pick-up surface, wherein said sleeve is slidable in a direction away from said pick-up surface and against said force to a withdrawn with respect to said magnet.

BRIEF DESCRIPTION OF THE DRAWINGS

A detailed description of preferred embodiments of the invention follows, with reference to the attached drawings, wherein.

DETAILED DESCRIPTION

The invention relates to a magnetic head for a magnetic pick-up tool which serves to reduce or eliminate side pull of the magnet, and further to enhance the pick-up force at the pick-up surface of the magnet, all advantageously and as desired in accordance with the present invention.

Figure 1:
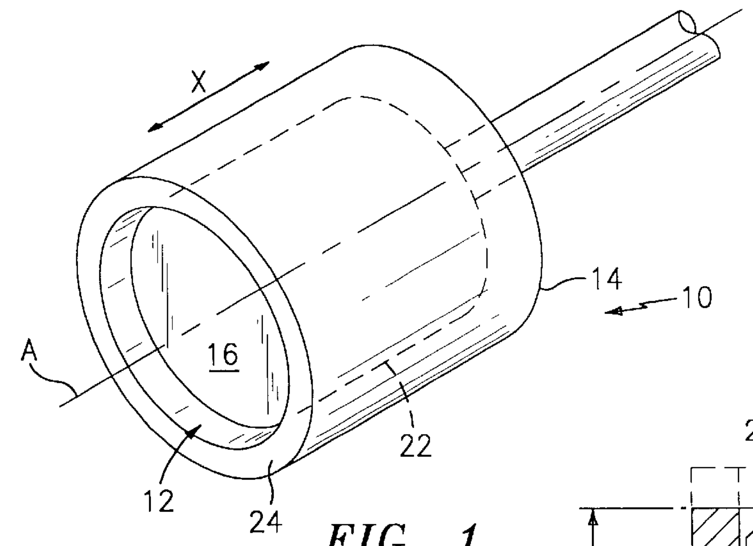
FIG. 1 is a perspective view of a magnetic head in accordance with the present invention.

Referring to the drawings, FIG. 1 shows a magnetic head generally referred to by reference numeral 10 and including a magnet 12 having a longitudinal axis A and a sleeve member 14 slidably positioned over magnet 12 and slidable in a direction along axis A as will be further discussed below.

Magnet 12 may preferably be a substantially cylindrical magnet as shown, or may have any other suitable shape such as, for example, square, rectangular, or partially circular, if desired. Magnet 12 preferably has a pick-up surface 16, and has a pole corresponding with pick-up surface 16 for attracting and holding ferrous or other magnetically attracted objects to pick-up surface 16.

Sleeve member 14 is preferably provided of a material which is acted upon by magnet 12, preferably a ferrous or other magnetically attracted material. Various grades of steel are suitable, and a low carbon or very low carbon steel or other soft steel is preferred and is effective at re-directing flux from magnet 12. Still referring to FIG. 1, sleeve member 14 preferably has a length 18 in the direction of axis A which is longer than a corresponding length 20 of magnet 12, also in the direction of axis A.

In accordance with the invention, sleeve member 14 is acted upon by magnet 12, and a force is exerted by magnet 12 upon sleeve 14, so as to bias sleeve 14 toward a rest position wherein sleeve 14 is substantially centered or magnetically balanced along axis A with respect to magnet 12. In this position, which is illustrated in FIG. 1, sleeve member 14 extends beyond magnet 12, at least beyond pick-up surface 16 of magnet 12, and preferably beyond each edge of magnet 12 as shown (see also FIG. 2). Sleeve 14 can be biased from the rest position rearwardly and away from pick-up surface 16 against the magnetic force of magnet 12 so as to allow objects to be picked up using pick-up surface 16 as described below. Magnet 12 serves to return sleeve 14 to the rest position after sleeve 14 is released or the object retrieved is removed from pick-up surface 16 as desired in accordance with the invention.

Magnet 12 normally has side or radial flux, which would undesirably attract ferrous or magnetically attractable objects to side surfaces 22 of magnet 12. According to the invention, sleeve 14 serves to absorb and redirect radial flux from magnet 12, so as to substantially deaden or eliminate any side attractive forces of magnet 12, so as to advantageously reduce or eliminate the possibility of magnet 12 attracting radially positioned objects which are not intended to be picked up with magnet 12. As set forth above, although high or low carbon, hardened or soft steels are suitable, it has been found that low carbon or very low carbon steel for sleeve 14 is very well suited for redirecting flux so as to induce another pole in front edge or ring 24 of sleeve 14 which serves to enhance the pick-up strength or force applied by magnet 12, which is advantageous in accordance with the present invention.

It has been found that sleeve member 14 may most preferably be provided having a wall thickness (t) sufficient to redirect substantially all radial flux from magnet 12. It has been found that suitable thickness of sleeve 14 can be related directly to the flux or power (P) of magnet 12 as follows. For a typical magnet, it has been found that for each 60–90 gauss of flux of magnet 12, approximately 1/1000 of an inch of sleeve thickness is desirable. In other words, a ratio of thickness (t) to power (P) is preferably between about 0.001 in/90 gauss to about 0.001 in/60 gauss. This relation between sleeve thickness and magnet characteristics has been found for a typical magnet to advantageously provide a sleeve which economizes material and nevertheless provides the desired dampening of side pull and focusing of radial flux from magnet 12 toward edge 24 of sleeve member 14 as desired. Of course, this relation may vary depending upon the type and grade of magnet used.

Figure 2:
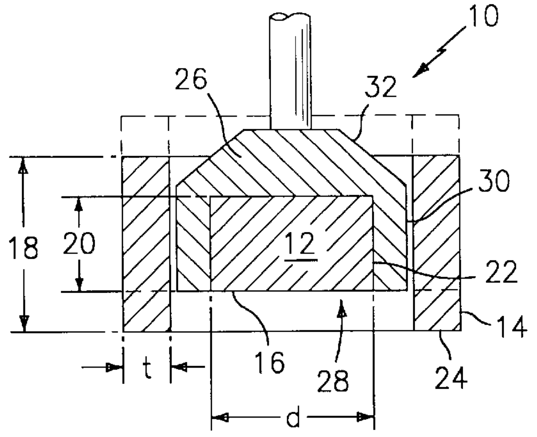
FIG. 2 is a cross-section of a magnetic head in accordance with the invention.

As set forth above, sleeve member 14 is held in the substantially centered position of FIG. 1 by magnetic force exerted by magnet 12. In accordance with the invention, sleeve 14 is slidable along axis A, in the direction of arrows X, against the magnetic bias of magnet 12. Referring also to FIG. 2, sleeve 14 is illustrated in the centered position, and, in dashed lines, in a rearwardly biased position wherein sleeve 14 has been biased against the force of magnet 12 to a position wherein pick-up surface 16 is more fully exposed for use in attracting and holding a ferrous or other magnetically attracted article. As set forth above, it should readily be apparent that upon removal of any such object, or other force biasing sleeve 14 against the force of magnet 12, that sleeve 14 will readily return to the substantially centered position of FIGS. 1 and 2.

Still referring to FIG. 2, an alternative embodiment of the invention is shown wherein magnet head 10 includes a magnet holder 26 having an interior well or opening 28 for receiving magnet 12, and having an exterior or peripheral surface 30 which surface is preferably substantially matched by sleeve 14 so that sleeve 14 is freely slidable along surface 30. In accordance with the invention, magnet holder 26 is preferably provided of a non-ferrous material such as, for example, aluminum, brass, plastic, non-magnetic stainless steel and the like. Holder 26 preferably freely transmits and does not interfere with flux from magnet 12 so that sleeve 14 can freely slide along holder 26 subject to the bias of magnet 12. As shown, magnet holder 26 preferably terminates toward pick-up surface 16 of magnet 12 in opening 28 as shown, and on an opposite side may suitably have shoulders 32 which are sloped inwardly toward axis A substantially as shown in FIG. 2. Shoulders 32 serve advantageously to guide sleeve 14 into a proper centered position with respect to magnet holder 26 and magnet 12 held thereby, especially if sleeve 14 is being biased from a position behind magnet holder 26 toward the centered position as desired. It should be noted that although holder 26 is disclosed in terms of a substantially cylindrical member, alternative structures could be provided, depending upon the shape of magnet 12. Further, alternative structure could be provided for positioning between magnet 12 and sleeve 14 as desired to provide for the free sliding nature of sleeve 14 relative to magnet 12 subject to magnetic force from magnet 12.

Figure 3:
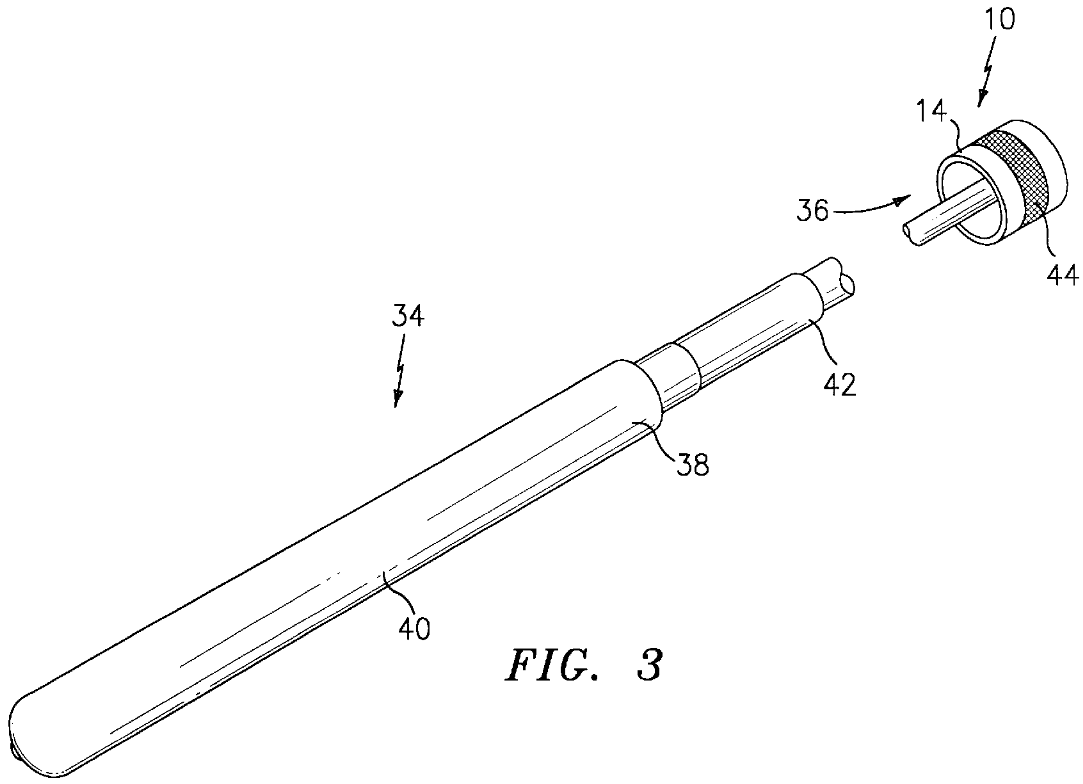
FIG. 3 is a perspective view a magnetic pick-up tool including a magnetic head in accordance with the present invention.

Referring now to FIG. 3, an application of magnet head 10 in accordance with the invention is illustrated. As set forth above, magnet head 10 may usefully be incorporated into a tool such as a pick-up tool having a magnet positioned at one end of a handle, preferably a substantially elongate device which can be used to retrieve magnetic objects from locations not easily reached by the person in question. FIG. 3 shows a magnetic pick-up tool 34 including magnetic head 10 in accordance with the invention attached at one end 36 of a substantially elongate handle member 38 which may be provided with a hand grip 40 as shown. Still further in accordance with this preferred embodiment, elongate handle member 38 includes a telescopic section 42 (partially broken away in FIG. 3) which can be used advantageously to provide for a longitudinally extendable tool for enhancing the reach of same. Any suitable extendable structure may be used in connection with handle member 38, and a telescopic section such as an antenna or the like has been found to be quite useful for same.

Alternatively, other structures may be provided for handle member 38, including but not limited to a simple rod, articulated members for pivot to fixed angle(s), flexible elongate structures, spring members and the like, and any other structure which enhances the use of the tool for a particular purpose.

Still referring to FIG. 3, sleeve member 14 may suitably be provided having a knurled, roughened or textured surface 44 positioned around at least a portion of the outer surface thereof. Surface 44 may serve in accordance with the present invention to provide better grip for manually moving sleeve 14 against the bias of magnet 12 as desired. Surface 44 may be provided in any desired ornamental pattern, such as an engraved diamond-like pattern and the like.

Figure 4:
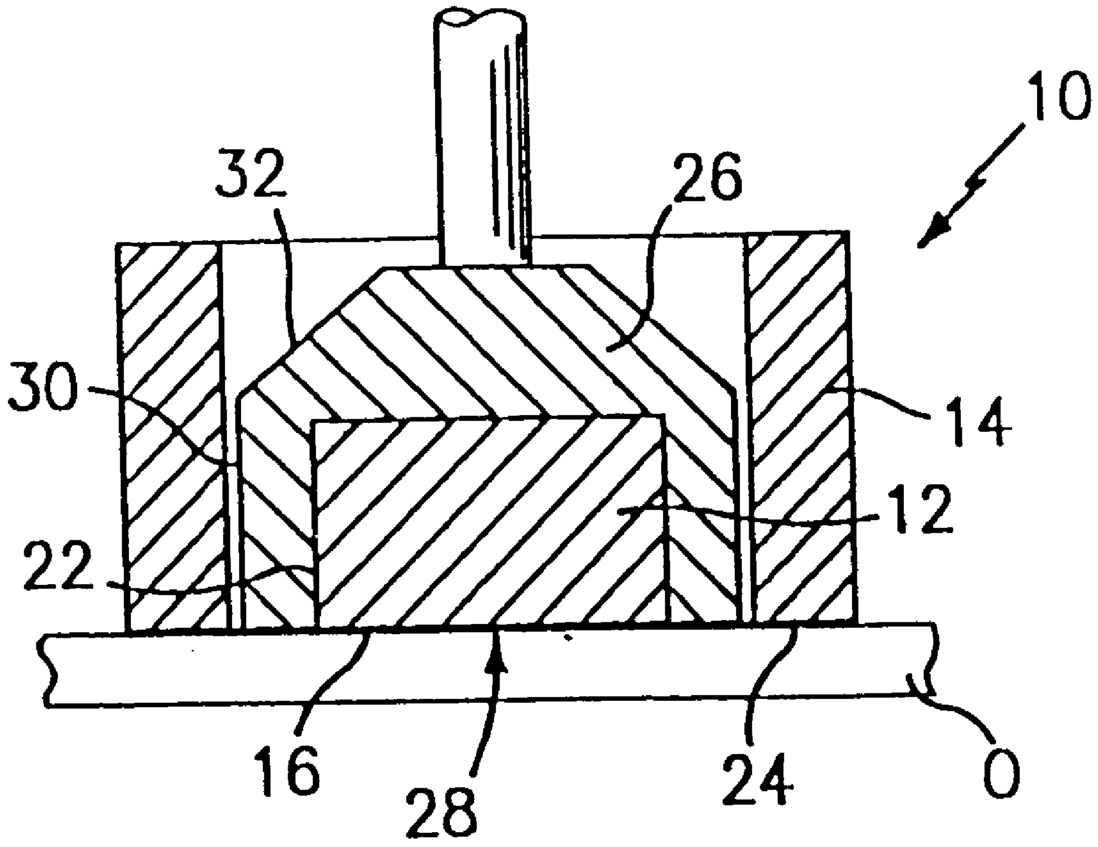
FIG. 4 is a cross-sectional view of a magnetic head in accordance with the present invention with an object held by the magnet.

Referring now to FIG. 4, magnet head 10 in accordance with the invention is shown in an operative position wherein sleeve 14 is deflected in a direction away from pick-up surface 16 along axis A so as to at least partially expose pick-up surface 16. As shown, an object (O) is held by pick-up surface 16 of magnet 12, and the force exerted upon object (O) is enhanced by the additional pull induced in edge 24 of sleeve 14 by radial flux from magnet 12. In an embodiment wherein pick-up surface 16 of magnet 12 is a North pole, sleeve 14 according to the invention advantageously provides another pole, oriented South, along edge 24 as described. For example, this orientation of poles in accordance with the invention has been found to provide a magnet head 10 having a typical magnet with a basic or normal force of attraction of approximately 4000 gauss with an additional pull of approximately 1200 gauss, which advantageously serves to increase the pulling power or force of magnetic head 10 in accordance with the present invention. As set forth above, once object (O) is retrieved and removed from magnetic head 10, sleeve 14 is returned by magnet 12 to the substantially centered or magnetically balanced rest position of FIGS. 1 and 2.

In accordance with the foregoing, it should readily be appreciated that a magnetic head and a magnetic pick-up tool including such head have been provided which readily accomplish each and every object of the present invention. Further, magnet head 10 of the present invention may suitably be incorporated into other tool structures as desired.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A magnet head for a magnetic pick-up tool, comprising:

a shaft;

a magnet;

a holder attached to said shaft for holding said magnet, said magnet and said holder defining a pick-up surface and an opposed end, said shaft extending from said opposed end in a direction away from said pick-up surface, and at least a portion of said shaft extending nonmovably fixed relative to said magnet; and a sleeve member having an open end and being slidably positioned over said magnet, said sleeve member comprising a ferromagnetic material acted upon by said magnet such that said magnet exerts a force upon said sleeve for maintaining said sleeve in a rest position wherein said open end extends beyond said pick-up surface, wherein said sleeve is slidable relative to said magnet and said shaft from said rest position in said direction away from said pick-up surface and against said force to a withdrawn position with respect to said magnet.

2. A magnet head according to claim 1, wherein said rest position is a substantially centered position of said sleeve with respect to said magnet.

3. A magnet head according to claim 1, wherein said rest position is a magnetically balanced position of said sleeve with respect to said magnet.

4. A magnet head according to claim 1, wherein said magnet has a longitudinal axis and wherein said sleeve is slidable relative to said magnet against said force along said axis.

5. A magnet head according to claim 1, wherein said sleeve is made of low carbon steel.

6. A magnet head according to claim 1, wherein said magnet is substantially cylindrical in shape, and wherein said sleeve is a substantially cylindrical sleeve.

7. A magnet head according to claim 1, wherein said magnet has side surfaces and wherein said sleeve redirects flux from said side surfaces of said magnet whereby said magnet has substantially reduced side pull.

8. A magnet head according to claim 1, wherein said pick-up surface has a basic force of attraction, and wherein said magnet within said sleeve exerts an actual force at said pick-up surface which is greater than said basic force.

9. A magnet head according to claim 1, wherein said sleeve has a thickness sufficient to redirect substantially all radially directed flux from said magnet.

10. A magnet head according to claim 1, wherein said sleeve is positioned substantially freely slidable relative to said magnet.

11. A magnet head according to claim 1, wherein said sleeve has a leading edge, and wherein said magnet magnetizes said leading edge of said sleeve so as to enhance attractive forces of said magnet head.

12. A magnetic pick-up tool, comprising:

a handle member having a shaft; and a magnet head attached to said handle member and comprising a magnet; a holder attached to said shaft for holding said magnet, said magnet and said holder defining a pick-up surface and an opposed end, said shaft extending from said opposed end in a direction away from said pickup surface, and at least a portion of said shaft being non-movably fixed relative to said magnet; and a sleeve member having an open end and being slidably positioned over said magnet, said sleeve member comprising a ferromagnetic material acted upon by said magnet such that said magnet exerts a force upon said sleeve for maintaining said sleeve in a rest position wherein said open end extends beyond said pick-up surface, wherein said sleeve is slidable relative to said magnet and said portion of said shaft from said rest position in said direction away from said pick-up surface and against said force to a withdrawn position with respect to said magnet, wherein said pick-up surface is at least partially exposed through said open end of said sleeve when said sleeve is in said withdrawn position.

13. A magnetic pick-up tool according to claim 12, wherein said handle member comprises a substantially elongate member.

14. A magnetic pick-up tool according to claim 12, wherein said handle member has an adjustable length.

15. A magnetic pick-up tool according to claim 12, wherein said magnet has a power (P), and wherein said sleeve has a wall thickness (t), and wherein a ratio of said thickness to said power is between about 0.001 in/90 gauss to about 0.001 in/60 gauss.

* * * * *